United States Patent Office 3,814,816
Patented June 4, 1974

3,814,816
VEGETABLE AERATING PROTEINS
Robert C. Gunther, Galesburg, Ill., assignor to A. E. Staley Manufacturing Company, Decatur, Ill.
No Drawing. Continuation of abandoned application Ser. No. 700,383, Jan. 25, 1968. This application Feb. 8, 1971, Ser. No. 113,756
Int. Cl. A23j 3/02; A23l 1/20
U.S. Cl. 426—46
16 Claims

ABSTRACT OF THE DISCLOSURE

Oil-free vegetable protein, preferably soya, is hydrolyzed in the presence of acid or alkali to give hydrolyzed protein having a predetermined degradation as determined by viscosity measurements of aqueous solutions, the hydrolyzed protein then further modified with pepsin to yield pepsin modified hydrolyzed protein which, in the presence of water and sugar, whips at a rapid rate of produce aerated products of low density.

---

This is a continuation of application Ser. No. 700,383 filed Jan. 25, 1968, now abandoned.

In the food industry, proteinaceous materials, such as egg whites, hydrolyzed milk proteins and soy albumen, have been used for many years as aerating agents. By an aerating agent is meant a material capable of entrapping air in an aqueous mix, such as the basic sugar-syrup mix used in the confectionery trade or the flour-sugar mixes used in the bakery field. A basic requirement of a good aerating material is, that it possess the ability to entrap the maximum quantity of air in the minimum length of time. In other words, such a product should whip rapidly to a high volume. The economies realized are rather obvious when such a product is used since the desired degree of aeration can be achieved with a minimum amount of whipping agent.

Egg albumen, hydrolyzed milk proteins and soy albumen, although effective in whipping air into certain type mixes, are lacking in total whipping efficacy and consequently must be utilized at relatively high concentrations to produce the desired degree of aeration.

This is also true of products of the types described in U.S. Pats. 2,381,407 and 2,502,029. The products described in U.S. Pat. 2,381,407 which are made by using papain as an enzyme modifying agent have poor aerating power and provided whipped products of a relatively high density. The products of U.S. Pat. 2,502,029 are comparable to ordinary soy albumen. In these products the starting protein is extracted but not hydrolyzed. The resultant products leave much to be desired from the standpoint of aerating ability and flavor.

One of the objects of this invention is to provide a new and improved protein material which can be whipped to produce an aerated product.

Another object is to produce an aerating substance of greatly improved whipping characteristics, greater water solubility, and a more bland flavor.

A further object of the invention is to provide a new and improved process for producing vegetable aerating protein which in the presence of water and sugar whips at a rapid rate to give aerated products of low density. Other objects will appear hereinafter.

In accomplishing these objects in accordance with this invention an oil-free vegetable protein, preferably soya protein, and preferably a protein that has been extracted in an alkaline aqueous solution, is hydrolyzed either in alkaline or acidic aqueous media to give a hydrolyzed protein having a predetermined degradation as determined by viscosity measurements of its aqueous solutions, and then further modified with pepsin to produce a pepsin modified hydrolyzed protein which, in the presence of water and sugar, will whip at a rapid rate to produce aerated products of low density.

For optimum results the hydrolyzed protein should be insoluble in water at its isoelectric point but should be sufficiently hydrolyzed that the viscosity of a 10% by weight solution of said hydrolyzed protein in water at pH 9.5 to 48° C. is not more than 100 centipoises, preferably 5–20 centipoises.

This invention is predicated upon the discovery that vegetable proteins which have been so hydrolyzed will produce upon pepsin enzyme hydrolysis, a completely different type product than would be obtained by the enzyme hydrolysis of the unmodified protein source. By "a completely different type product" is meant a product which has at least twice the whipping efficiency of the conventional product, and also a product with much improved flavor.

In accordance with one embodiment of this invention, a proteinaceous material such as oil-free soybean meal or flakes may be extracted with an aqueous alkaline solution (e.g., sodium carbonate, sodium hydroxide), preferably at a pH in the range of 7.5–10.0 and a temperature of 30°–50° C. The insolubles may be removed from the extract solution either by filtration or centrifugation and the clarified extract liquor is given a relatively mild alkaline hydrolysis by treatment with an alkali (e.g., sodium hydroxide or calcium hydroxide) at a temperature of 50°–85° C. for 1 to 2 hours (the amount of alkali used will ordinarily be from 5% to 10% by weight of the protein content of the extract liquor). The amount of alkali used, the temperature and length of time of the treatment will be determined by the degree of hydrolysis desired. It is most important that the hydrolysis be terminated before the protein is hydrolyzed to the point that it would be soluble at its usual insoluble isoelectric pH. Following hydrolysis, the pH is adjusted to the isoelectric pH of the protein, pH 4.1–4.5, and the precipitated curd is washed free of soluble carbohydrates, minerals, etc., by decantation.

The enzymatic modification is carried out by first treating the purified alkaline modified protein curd with a suitable acidifying agent such as sulfuric or hydrochloric acid to produce a pH ordinarily in the range of 1.2 to 2.5 and at a temperature of 25° C. to 40° C. The enzyme, pepsin (1:10,000 strength), is then added in an amount usually of 0.05 to 0.5% by weight of the protein content of the solution.

Enzyme modification is allowed to proceed for 18 to 24 hours, after which the solution may be heated to 60°–70° C. to stop enzyme action. The pH is then adjusted to 5.0 to 5.5 with caustic, and the solubles separated from the insolubles by filtration or centrifugation. The clear aqueous solution containing the solubles is then spray dried to produce a very light colored, free flowing product.

Two products made in accordance with this invention, (referred to for convenience as E–500) were compared for whipping efficiency with soy albumen, a hydrolyzed milk protein and egg albumen in both an ice-box chiffon mix and a conventional corn syrup sugar mix. The comparative test results are set forth in Table A.

TABLE A

| | 80/20 corn syrup/sugar | | Chocolate chiffon pie | |
|---|---|---|---|---|
| | Percent whipping agent used [1] | Whip volume, oz./gal. | Percent whipping agent used [1] | Pie density, oz./gal. |
| E–500, Run No. 1 | 1 | 60 | 4.4 | 42 |
| E–500, Run No. 2 | 1 | 59 | 4.4 | 38 |
| Soy albumen | 1 | 81 | 4.4 | 136 |
| Egg albumen | 1 | 80 | 4.4 | 138 |
| Hydrolyzed milk protein | 1 | 74 | 4.4 | 66 |

[1] Percent whipping agents used based on total dry weights.

The applications and uses of a whipping agent with the whipping efficiency and relatively bland flavor of the E–500 type protein designated above are many and varied. One of the outstanding properties of the E–500 type whipping proteins is its ability to aerate whole egg mixes. Egg albumen, soy albumen and hydrolyzed milk protein will not produce this effect. For example, 260 grams fresh whole eggs and 5 grams E–500 type protein can be whipped to a specific gravity of 0.19 in 2 minutes in a Mixmaster beater. This is a stiff, rigid whip which can be folded into batters, etc.

This same amount of fresh whole eggs with as much as 10 to 15 grams of egg albumen (or soy albumen or hydrolyzed milk protein) showed no aeration even after 10 to 15 minutes whipping.

Consequently, one of the principal specific applications of this new protein product is in a prepared sponge cake mix in which whole eggs are added to the dry, prepared mix and whipped to a light aerated batter.

Also, an E–500 type protein, because of its low flavor level and whipping efficiency, finds usage in other prepared (or packaged) cake mix products. In packaged angel food cake mixes, this whipping protein greatly improves the egg white foam whipping rate and volume.

The E–500 proteins can also be used in dry chiffon pie mixes, which by the simple addition of hot water, can be whipped in a matter of minutes to a light, fluffy chiffon. This whipped chiffon is then placed in a pie shell and chilled to set the filling. In this case, the conventional whipping agents will require 3 to 4 times longer whipping time to produce the same degree of aeration.

In general, it may be stated that the very high whipping efficiency and the low flavor level of the E–500 type proteins make them particularly adaptable to dry, packaged food mixes in which rapid aeration is desired. The chiffon mixes, angel food cake mixes, icing mixes, etc., represent but a few of the many applications of this protein in that type of product.

In the general method of preparation outlined above, the alkaline hydrolysis was carried out on the extraction liquor after separation from insolubles but prior to isolation of the glycinin from sugars, salts, etc. This is but one of several methods of this invention. The alkaline hydrolysis can be made directly on the soybean meal or flakes, or it can be made on the purified isolated glycinin curd after washing out all water soluble materials.

As the alkali to be used in the hydrolysis of the protein, it is preferred to employ an alkali metal or alkaline earth metal hydroxide, caustic soda alone or in conjunction with lime being particularly effective. The temperature of the hydrolysis may vary considerably depending upon the particular set of conditions being used, but ordinarily the protein modification (hydrolysis) would be conducted in the range of 40° C. to 80° C. The enzyme modification of the partially hydrolyzed protein is carried out in the pH range of 1.2 to 2.5 and at temperatures in the range of 20° C. to 50° C. The concentration of 1:10,000 strength pepsin is generally in the range of 0.05% to 0.7% of the amount of protein being used. Larger amounts of pepsin can be utilized but for economical reasons, this is not considered practical.

Following enzyme modification, the pH of the reaction slurry is usually adjusted to between 3.0 and 5.5 prior to separation of the solubles from the insolubles. Also, the slurry may be heated to anywhere between 40° C. and 100° C. to precipitate heat coaguable protein and to facilitate the filtration operation, although this is not a necessary procedure, depending upon the type of product desired. The heating can be carried out either before or after adjusting the pH.

In the practice of this invention, the various conditions of the alkaline hydrolysis such as temperature, time, concentration of alkali, pH, etc., may be varied to a considerable extent without materially affecting the characteristics of the end product provided that several factors are varied simultaneously. Thus, it is obvious that in general a decrease in temperature may be compensated by an increase in the strength of the alkali employed or by an increase n the duration of the hydrolysis.

The invention will be further illustrated, but is not limited, by the following examples in which the quantities are stated in parts by weight unless otherwise indicated.

EXAMPLE I

One hundred pounds of oil-free soybean flakes was slurried in 1000 pounds of water at a temperature of 30° C. for 10 minutes. One and a half (1½) pounds of caustic soda in 4 pounds water was added and the slurry mixed continuously for 1 hour. The insoluble flake residue was separated from the soluble matter by centrifugation. After separation of the solubles from the insolubles, the extract liquor was heated to 80° C. and 1 pound of 35% hydrogen peroxide was added rapidly to the continuously stirred solution. After 10 minutes, 4 pounds of 50% caustic soda was added and the solution held with gentle agitation at 80° C. for 30 minutes. The solution was then adjusted to pH 4.4 with 10% sulfuric acid to precipitate the partially modified glycinin curd. The precipitated curd was separated and washed twice by decantation with 1200 pounds water at room temperature.

The washed curd (at a temperature of 30° C.) then was treated with 20% hydrochloric acid to give a pH of 1.3. At this stage the curd was approximately 90% dissolved. Pepsin 1:10,000 in the amount of 57 grams dissolved in 500 ml. water was added and the mixture stirred for 4 hours. After 2 hours and 4 hours, the pH of the solution was adjusted back to 1.3 with 20% hydrochloric acid. The total enzyme modification time was 20 hours. After modification, the solution was heated to 70° C. and the pH adjusted to 5.0 with 15% caustic soda solution. Ten pounds of diatomaceous filter aid was added and the solubles separated from the insolubles by filtration. The filtered liquor was then spray dried to produce a very light color, bland product. This product may be designated E–500 and is that indicated in Table A and described above.

EXAMPLE II

One hundred pounds of oil-free soybean meal was slurried in 2000 pounds of water at 50° C. and mixed for 5 minutes—or until completely wetted out. Caustic soda solution (15%) was added to give a pH of 8.5, and the pH was maintained at 8.0 to 8.5 for 1 hour with continuous agitation. After separation of the solubles from the insolubles by centrifugation, the pH of the extract liquor (at 50° C.) was adjusted to 4.4 to 4.6 with 5% sulfuric acid at 50° C., and the precipitated glycinin allowed to settle. The supernatant was decanted and the glycinin curd washed once more by decantation with 2000 pounds of water at 50° C. One and a half pounds of caustic soda in 4 pounds water and one and a half pounds of lime (calcium hydroxide) in 4 pounds water were added and the solution slowly agitated for 2½ hours. The pH of the solution was then adjusted to 4.4–4.6 with 15% sulfuric acid and the precipitated curd was separated by decantation.

The enzyme modification of the partially hydrolyzed curd was carried out as described in Example I.

EXAMPLE III

One hundred pounds of oil-free soybean flakes was slurried in 2500 pounds of water at 50° C. and mixed for 15 minutes. A solution of 2 pounds of caustic soda in 5 pounds of 50° C. water and a solution of 2 pounds of lime in 5 pounds of 50° C. water were added and the slurry slowly agitated for 2½ hours at 50° C. The pH of the solution was then adjusted to 4.4–4.5 with 10% hydrochloric acid. The precipitated curd, along with the flake residue, was separated by decantation and washed twice with 2500 pounds of water at 30° C.

Then 20% hydrochloric acid was added to the washed curd and flake residue to give a pH of 1.5 at a temperature of 28° C. To the acid mix was then added 100 g. of pepsin (1:10,000) in 400 ml. water. The slurry was continuously stirred for 5 hours then let stand for 17 additional hours, or a total enzyme treatment time of 22 hours. (After 1, 3 and 5 hours, the pH was adjusted back to 1.5.) After modification the mix was slowly heated over a 30 minute interval to 65° C., the pH adjusted to 5.1–5.2 with 15% caustic soda solution, and the solubles separated from the insolubles by filtration, using a diatomaceous earth as a filter aid. The sparkling clear liquor so obtained was dried by spray drying to yield a light colored, bland, free-flowing product of the E–500 type.

EXAMPLE IV

One hundred and fifty pounds of oil-free soybean flakes was slurried in 2000 pounds of water at a temperature of 35° C. for 5 minutes. Two and a half (2½) pounds of caustic soda dissolved in 5 pounds water was added and the slurry stirred continuously for 1½ hours. After separation of the solubles from the insolubles by centrifugation, the extraction liquor was heated to 70° C., and 8 pounds of 50% caustic soda solution was added and the solution held at 70° C. for 45 minutes. The pH of the solution was then adjusted to 4.5 with 10% hydrochloric acid and the precipitated glycinin curd was separated and washed twice by decantation with 2000 pounds of water at 30° C.

The washed curd at 30° C. was then treated with 25% hydrochloric acid to give a pH of 1.6 twenty-seven grams of pepsin (1:10,000 strength) dissolved in 200 g. water was added and the mix slowly agitated for 3 hours, after which time the pH was readjusted to 1.6 with hydrochloric acid. The mixture was allowed to stand 18 hours. Causitc soda (15%) was added to bring the pH to 4.3, 20 pounds of diatomaceous filter aid was added to the mix and the solubles separated from the insolubles by filtration. Caustic soda solution was added to the clear filtrate to give a pH of 5.1. Following concentration by evaporation to approximately 30% solids, the product liquor was spray dried.

The degree of alkaline hydrolysis of a partially degraded protein has been determined by measuring the viscosity of a 10% solution of the protein at 48° C. with a Brookfield viscometer. Some results of these measurements are summarily reported below in Table B.

TABLE B

| 10% solution of protein (—sodium hydroxide to pH 9.5) | Source | Viscosity, cps.[1] |
|---|---|---|
| (1) Isolated soya protein (not degraded) | Commercial | 6,200 |
| (2) do | do | 3,000 |
| (3)[2] Experimental protein (partially degraded) | Example I | 11 |
| (4)[2] do | Example II | 7 |

[1] Brookfield viscometer; temperature 48° C.
[2] Viscosity measurements were made on protein after alkali modification and before enzyme modification.

The preparation of enzyme modified whipping agents from the unmodified and modified proteins tabulated above indicated that the E–500 type whipping protein could be prepared only from the low viscosity proteins (3 and 4) and not from the high viscosity proteins (1 and 2). These latter two, on enzyme hydrolysis, produced a soy albumen-like whipping agent.

A typical analysis of an E–500 type protein is as follows:

|  | Percent |
|---|---|
| Protein (N×6.25) | 81.0 |
| Moisture | 4.0 |
| Ash | 14.0 |
| Carbohydrate (diff.) | 1.0 |
|  | 100.0 |

EXAMPLE V

Acid hydrolysis of protein

One hundred pounds of oil-free soybean flakes was slurried in 1,000 pounds of water at 30° C. for 10 minutes. A 15% caustic soda solution was added to the agitated slurry to give a pH 8.7, and the slurry stirred continuously for 1 hour. The insoluble flake residue was separated from the soluble matter by centrifugation, and the insoluble residue washed once with 500 pounds of water at 30° C. The combined solutions were then adjusted to pH 4.3 with 10% sulfuric acid to precipitate the glycinin curd. The curd was separated and washed twice by decantation with 1,200 pounds water at 30° C.

The washed glycinin curd (containing approximately 12% solids by weight) was slurried in 200 pounds water and while stirring vigorously 30 pounds of concentrated (98%) sulfuric acid was added to produce an acid concentration of 10%. This acid solution was then heated to 80° C. and held at 80° C. with slow agitation for 1 hour.

After 1 hour, the solution was diluted with 3000 pounds cold water and the pH adjusted to 4.4 with 20% caustic solution to precipitate the partially modified glycinin curd. The precipitated curd was separated and washed twice by decantation with 3000 pounds of water at room temperature.

The washed curd was then enzyme modified with pepsin and processed following the general procedure outlined in Example I, to produce a very light colored, relatively bland protein product.

A 10% solution of the acid hydrolyzed protein from which the pepsin modified product was prepared had a viscosity of 7.5 cps. (pH 9.5/48° C.).

The final product in the standard Chocolate Chiffon Whip Test readily whipped to a minimum density of 0.310 g./ml. and required 2 minutes and 30 seconds to achieve a density of 0.44 g./ml.

EXAMPLE VI

To 125 pounds of water at 30° C. in a 30 gallon tank was added 10 pounds of solvent extracted soybean flakes. Caustic soda (15% solution) was added to obtain a pH of 8.5. The flakes slurry was then agitated for 1 hour during which time the pH was maintained at 8.5 by the addition of caustic soda solution. Agitation was stopped and the slurry allowed to settle for 2 hours. The clear supernatant liquid (comprising approximately ½ the original volume of the slurry) was removed and filtered through a 60 mesh screen to separate small amounts of very finely dispersed flake material.

To the remaining slurry in the tank was added an equal volume of water at 30° C. and the slurry agitated for 30 minutes at a pH of 8.5. Again the suspension was allowed to settle for 2 hours and the clear supernatant removed as before.

The two clear supernatant solutions were combined and then heated to 80° C. for the alkaline hydrolysis. Caustic soda (40% solution) was added to obtain a pH of 11.8 and the solution gently agitated for 25 minutes. Hydrochloric acid (20%) was then added to obtain a pH of 4.4. The precipitated protein was allowed to settle for 4 hours and the clear supernatant removed by decantation. The protein curd was washed once with cold tap water in an amount equal to the original volume of the solution.

A sample of the washed curd was removed and further concentrated to 20% solids. After dissolving at pH 9.5 and heating to 48° C. for 1 hour, a viscosity determination was made. The viscosity was 135 centipoises.

The solids of the washed curd in the tank were adjusted to 6%–7% by the addition of water, and 20% hydrochloric acid added to obtain a pH of 1.5. The slurry was then heated to 30° C. and 0.4% of 1:10,000 pepsin (based on weight of dry solids) added. The mix was stirred for 5 hours (pH adjusted twice during this period to 1.5) and then allowed to stand at 30° C. for 17 hours, or a total enzyme modification time of 22 hours.

At the end of this period, the solution was heated to 70° C., and caustic soda solution added to raise the pH of the solution to 5.1. Filter aid was added and the soluble separated from the insolubles by filtration.

The clear liquor from the filter press was spray dried in a stream of heated air to yield a light colored, free-flowing powder.

Using the chocolate chiffon whip test the minimum density of the whipped product was determined to be 0.305 gram/ml. The time required to obtain a density of 0.44 g./ml. was one minute and forty-five seconds. A pepsin modified soy protein made by a similar process without hydrolyzing the protein, when tested in the same manner, had a minimum density of 0.409 g./ml. and a whip rate of three minutes and fifty seconds to achieve a density of 0.44 g./ml.

The chocolate chiffon whip test previously referred to in the examples is carried out as follows: dry blend 154 g. of chocolate chiffon base (a mixture of sucrose, nonfat milk powder, cocoa, starch and gelatin) and 9.0 g. of whipping agent in the small bowl of a Mixmaster beater. Add 240 ml. (1 cup) of boiling water and beat on highest speed (No. 12) for 4 minutes. The density of the aerated mix is determined by weighing a sample in a calibrated beaker.

Another way of evaluating the invention is with low moisture corn syrup. Thus, 4 pounds of corn syrup is placed in a beater. To this is added 0.1 pound whipping agent mixed with 0.4 pound water. The resultant mixture is whipped slowly until well mixed, then at high speed until maximum volume is achieved. A cooked syrup is prepared by cooking a mixture of 2 pounds of corn syrup, 4 pounds sucrose and 0.5 pound of water to 240° F. The hot syrup is added while mixing in a beater at low speed to the cold corn syrup containing the whipping agent and the resultant mixture is beaten at high speed for two minutes. The amount of aerated product is measured in ounces per gallon. It requires approximately 1% of whipping agent (1 pound to 100 pounds of syrup comprising 60% corn syrup and 40% sucrose) to give 60–64 ounces per gallon of whipped product. The products of U.S. 2,502,029 require at least 2% or twice as much whipping agent to obtain the same amount of whip. Six or eight times as much of the products of U.S. 2,381,407 are required to obtain the same amount of whip.

In addition to advantages already mentioned, the process of the invention gives high yields. The products have a bland flavor and are better tasting than products prepared without the hydrolysis step. The products of the invention are completely soluble in water at the isoelectric point of the hydrolyzed protein. They are also soluble over the entire pH range.

While the invention is particularly valuable where the protein used is soy protein, it can also be applied to other vegetable proteins, for example, those derived from cottonseed, peanut, sesame and the like.

Where an acid is used to hydrolyze the protein, any nontoxic hydrolyzing acid can be used (e.g., sulfuric, hydrochloric and phosphoric). Mineral acids are preferred.

In the examples, where hydrogen peroxide is used, it is employed primarily to improve color and can be omitted.

The purification of the protein initially by alkaline extraction followed by precipitation and washing are optional steps. The precipitation and separation of the protein from the mother liquor after extraction are optional. However, if one does not precipitate the protein at its isoelectric pH and remove the accompanying clear supernatant liquor, a considerable amount of salts would be included with the protein to be enzyme modified and this gives a final whipping agent containing a higher sodium chloride content than is desirable. Similarly, after enzyme modification a purification step is optional but desirable.

I claim:
1. A process of preparing aerating proteins which comprises the steps of:
 (a) hydrolyzing oil-free vegetable proteins under alkaline or acid conditions to give hydrolyzed proteins having a predetermined degradation as determined by viscosity measurements of its aqueous solutions, said hydrolyzed proteins being insoluble in water at its isoelectric point but sufficiently hydrolyzed that the viscosity of a 10% by weight solution in water at pH 9.5 and 48° C. is at least 5 centipoises and not more than 100 centipoises, and
 (b) then further modifying the resultant hydrolyzed proteins with pepsin to produce pepsin modified proteins characterized as being soluble in water at the isoelectric point of the hydrolyzed proteins of step (a) above and thereby obtain pepsin modified proteins which in the presence of water and sugar whip at a rapid rate to produce aerated products of low density.

2. A process as claimed in claim 1 in which said vegetable protein is soya and wherein after modifying of the protein with pepsin, the pepsin modified protein in the form of aqueous slurry is adjusted to a pH between 3.0 and 5.5 to provide a water soluble soya protein portion and a water insoluble soya protein portion, the water soluble portion is separated from the water insoluble portion and the water soluble portion is recovered to provide a pepsin modified protein which in the presence of water and sugar whip at a rapid rate to produce aerated products of low density.

3. A process as claimed in claim 1 in which said vegetable protein is extracted with an alkaline aqueous solution, any insoluble residue is separated, the pH of the residual solution is adjusted to the isoelectric point, the resultant precipitate is separated, then re-slurried in water before hydrolyzing.

4. A process as claimed in claim 1 in which the vegetable protein is hydrolyzed under alkaline conditions.

5. A process as claimed in claim 1 in which the vegetable protein is hydrolyzed under acidic conditions.

6. A process as claimed in claim 1 in which said hydrolyzed protein is insoluble in water at its isoelectric point but is sufficiently hydrolyzed that the viscosity of a 10% by weight solution in water at pH 9.5 and 48° C. is within the range of 5 to 20 centipoises.

7. A process as claimed in claim 1 in which the pepsin modified hydrolyzed protein in the form of an aqueous slurry is acidified to a pH of 3.0 to 5.5, heated to a temperature of between 40° C. and 100° C., then filtered and the solids recovered from the filtrate.

8. A process of preparing aerating soya protein which comprises extracting oil-free soya bean meal or flakes with an aqueous alkaline solution at a pH in the range of 7.5 to 10.0 and a temperature of 30° C. to 50° C., separating the insolubles from the extract solution, subjecting the extract liquor to alkaline hydrolysis at a temperature of 50° C. to 85° C., the hydrolysis being carried out until the hydrolyzed protein is insoluble in water at its isoelectric point but sufficiently hydrolyzed that the viscosity of a 10% by weight solution in water at pH 9.5 and 48° C. is at least 5 centipoises and not more than 100 centipoises, adding an acid to the hydrolyzate in sufficient amount to adjust the pH to the isoelectric pH of the protein, thereby causing precipitation of the protein, separating the precipitated protein, washing said precipitated protein with water to remove soluble carbohydrates and minerals and produce a purified alkaline-modified soya protein, acidifying said alkaline modified soya protein with an aqueous solution of a mineral acid to give a pH within the range of 1.2 to 2.5, and subjecting the acidified solution at a temperature of 20° C. to 50° C. to enzyme modification with the enzyme pepsin added in an amount of 0.05% to 0.7% by weight, expressed as 1:10,000 strength, of the protein content of the solution for 18 to 24 hours, thereafter heating the solution to a temperature sufficient to stop the enzyme action, adjusting the pH of the resultant slurry to between 3.0 and 5.5 and heating said slurry to a temperature between 40° C. and 100° C. to precipitate heat coaguable protein, separating the solubles from the insolubles and recovering the solids from the soluble portion of the product.

9. A process as claimed in claim 8 in which said extract liquor is subjected to an acid hydrolysis instead of an alkaline hydrolysis.

10. A pepsin modified hydrolyzed protein obtained in accordance with the process of claim 1.

11. A pepsin modified hydrolyzed soya protein obtained in accordance with the process of claim 2 and further characterized as having a whipping capacity such that one part by weight of said protein whipped with 100 parts by weight of a mixture of 60 parts corn syrup and 40 parts sucrose will give 60-64 ounces per gallon of whipped product.

12. A bakery product mix adapted to provide an aerated bakery product, said mix containing the protein product as claimed in claim 10 in an amount effective to enhance the aeration of said mix.

13. A cake mix comprising a protein product as claimed in claim 10 in an amount effective to enhance the aeration of said mix.

14. A chocolate chiffon pie mix comprising a protein product as claimed in claim 10 in an amount effective to enhance the aeration of said mix.

15. A bakery product adapted to provide an aerated bakery product, said bakery product comprising whole eggs and a protein product as claimed in claim 10 in an amount effective to enhance the aeration of said eggs.

16. A process of aerating whole eggs which comprises whipping whole eggs with a protein product as claimed in claim 10 in an amount effective to enhance the aeration of said eggs.

References Cited
UNITED STATES PATENTS

| | | | |
|---|---|---|---|
| 1,373,651 | 4/1921 | Cullen | 99—114 |
| 2,381,407 | 8/1945 | Levinson | 260—112 |

FOREIGN PATENTS

| | | | |
|---|---|---|---|
| 478,777 | 1951 | Canada | 99—17 X |
| 478,778 | 1951 | Canada | 99—17 |

OTHER REFERENCES

Food Engineering, April 1959, pp. 104–105.

RAYMOND N. JONES, Primary Examiner

U.S. Cl. X.R.

426—52, 63, 148, 156, 159, 163, 165, 212, 348; 195—29

UNITED STATES PATENT OFFICE
CERTIFICATE OF CORRECTION

Patent No. 3,814,816                              Dated  June 4, 1974

Inventor(s)  Robert C. Gunther

It is certified that error appears in the above-identified patent and that said Letters Patent are hereby corrected as shown below:

Column 2, line 7; for "to" read ---and---
Column 2, line 9; for "predicted" read ---predicated---
Column 4, line 4; for "n" read ---in---
Column 4, line 29; for "1:10,000" read ---(1:10,000)---
Column 5, line 31; for "1.6  twenty" read ---1.6. Twenty---
Column 5, line 35; for "causitc" read ---caustic---
Column 6, line 44; for "flakes" read ---flake---
Column 7, line 4; for "peroid" read ---period---

Signed and sealed this 8th day of October 1974.

(SEAL)
Attest:

McCOY M. GIBSON JR.                     C. MARSHALL DANN
Attesting Officer                       Commissioner of Patents